United States Patent Office 2,898,312
Patented Aug. 4, 1959

2,898,312

PRODUCTION OF A CELLULAR POLYVINYL POLYESTER PLASTIC COMPOSITION

Waclaw Szukiewicz, Forest Hills, N.Y., and Anthony R. Steimle and Philip H. Rhodes, Cincinnati, Ohio, assignors, by mesne assignments, to Philip H. Rhodes, Cincinnati, Ohio No Drawing. Application October 6, 1954
Serial No. 460,766

10 Claims. (Cl. 260—2.5)

The present invention relates to the production of a foamed cellular plastic mass of improved physical properties.

More specifically, the present invention relates to the manufacture of a cellular product by reacting a polyvinyl chloride plastisol, an isocyanate-reactive polyester, and a polyisocyanate.

It has been proposed heretofore to produce a cellular plastic composition adapted to be foamed by mixing a polyisocyanate, a saturated and/or unsaturated polyester resin and reacting the mixture, said mixture foaming during the reaction step. The resulting foams may vary from extremely brittle and very rigid foams to soft elastic foams. These rigid foams are characterized by being extremely brittle and crush readily under the impact of a blow, whereas the foamed product of the present invention is extremely resistant to impact and shows complete recovery when indented by means of an impact blow. The soft foams of the isocyanate type of the prior art are characterized by being flammable and have necessitated considerable modifications in formulation to provide soft foams capable of safe use with regard to flammability. The soft foamed products of the present invention are characterized by being flame resistant and require no additional flame-proofing agent. Furthermore, the foam products of the present invention are substantially less costly and require considerably less skill in the preparation of the foamed article due to the great latitude incorporated by the presence of a large amount of polyvinyl chloride plastisol.

It has been proposed to produce a polyvinyl chloride foam by dissolving a gas as, for example, carbon dioxide, under pressure in a polyvinyl chloride plastisol, following which the composition containing the dissolved gas is allowed to expand under atmospheric pressure and in the expanded state is cured, or such polyvinyl chloride foams have been prepared by the incorporation of a chemical blowing agent in the plastisol, following which the so-prepared plastisol was heat-cured to decompose the blowing agent and form a set expanded cellular mass.

The polyvinyl chloride foams of the prior art have been characterized by being heat sensitive, that is, at elevated temperatures plastic material would soften and the cells would collapse, whereas the foamed product of the present invention wherein a polyvinyl chloride plastisol is reacted with a polyester and a polyisocyanate may be maintained at a temperature of 350° F. or even higher for considerable periods of time without any evidence of cell collapse.

Furthermore, the foamed products of the present invention are superior to the rubber foams of the prior art in that they are resistant to oxidation and the effects of sunlight and maintain resiliency during long periods of such exposure. The foamed products of the present invention may be utilized more readily than the prior art foams as cushioning materials because of the slow recovery following compression which results in no shock transmission to the cushioned article.

One of the primary objects of the present invention is to produce a cellular plastic composition by mixing a polyvinyl chloride plastisol with a polyester or alkyd resin and a diisocyanate including the aromatic and aliphatic diisocyanates of the prior art, said diisocyanates being reactive with the polyester or alkyd resin to liberate carbon dioxide and foam and cross-link the reaction mixture.

Other objects of the present invention will become apparent from the following detailed description of typical preferred examples.

*Example 1*

A mixture of polyvinyl chloride, a plasticizer, and a stabilizer is made by combining the following ingredients:

120 parts of polyvinyl chloride (Geon 121)
80 parts of plasticizer, tricresyl phosphate
5 parts of stabilizer, barium-cadmium laurate The polyvinyl chloride used is in the form of a powder and it is mixed with the plasticizer, such as tricresyl phosphate, and the stabilizer to form a smooth fluid paste or uniform dispersion of the resin and the stabilizer in the tricresyl phosphate plasticizer. This resulting product is known in the art as a plastisol.

To the above prepared plastisol there was added an isocyanate-reactive polyester. This alkyd polyester is prepared by condensing 7.6 moles of glycerol, 5 moles adipic acid, and one mole of phthalic anhydride. The alkyd polyester is condensed to such a degree that it possesses the following properties:

Acid number 40–46
Hydroxyl number 475±6%
Moisture content 0.6%–1.0%

This resin is marketed under the proprietary name of Selectron 5922 and is obtainable from the Pittsburgh Plate Glass Company.

The above produced polyester resin was then added to the plastisol in an amount of 18 parts by weight. Thereafter, a small amount of water was added, namely, 1.4 parts by weight. Thereafter, 28 parts of meta-toluene diisocyanate was added to the so-produced product and the resulting mixture heated between 10 and 15 minutes at 160° F. followed by a heating period of two hours at 260° F. The resulting cured foam was exceedingly tough and resilient with good cell structure and has a density of about 20 pounds per cubic foot. The small amount of water added during the mixing process is for the purpose of reacting with the isocyanate to produce additional carbon dioxide for the expansion of the cellular mass. The reaction between the isocyanate groups and the hydroxyl and carboxyl groups of the polyester resin also forms carbon dioxide at the same time cross-linking and setting operation occurs. It is preferable to heat in several steps. The first heating is for the purpose of assuring complete reaction to form carbon dioxide to permit maximum expansion of the mass due to the formation of gas cells before the viscosity of the mass is increased due to the setting action to such an extent that the expansion of the mass is seriously inhibited. Additional heating after expansion has occurred is for the purpose of completing the cure or set of the foamed cellular mass. Instead of having merely two heating steps, there could be three or even more heating steps depending on the character of the cellular mass being foamed and the properties it is desired to impart to the foamed mass. It is desired to point out that while the mixture above set forth may be cured in one step at a temperature of 260° F. or even higher, due to the poor heat transmission of the cellular mass, superior results are obtained by gradually raising the temperature to which the mass is exposed during curing. It may be stated that where large cellular masses are being prepared, the gradual increase or stepwise increase in curing temperature permits the interior of the piece to be raised to the proper curing temperature without subjecting the external surfaces to excessive heat for too long a period. Therefore, in one of the preferred forms of the present invention, the foamed mass produced as set forth or by equivalent methods is heated in a plurality of steps, the first step being of such a duration and at such a temperature so as to effect substantial conversion into carbon dioxide and expansion prior to the inception of any substantial degree of setting. In view of the above, the times of heating and temperatures of heating are to be considered as illustrative of suitable times and temperatures and are not present by way of limitation. In other words, the object set forth in using a plurality of heating steps can be obtained by using different times and different temperatures.

In the above example instead of using tricresyl phosphate, there may be substituted therefor dioctyl phthalate, diethylene glycol dibenzoate, or any of the prior art plasticizers for polyvinyl chloride or equivalents thereof. In general, the plasticizer should be of such a nature that the plasticizer will dissolve the resin when the mixture is heated to the proper temperature. The plastisol may comprise polyvinyl chloride or its equivalent and from 40 to 150 parts of plasticizer per 100 parts of the substantially dry resin.

It is desired to point out that the isocyanates are reactive compounds which react with carboxyl or hydroxyl groups. Further, the isocyanates form addition products with labile or active hydrogen atoms. It is desired to point out in carrying out the present invention a polyisocyanate is used, that is, an isocyanate having at least two reactive isocyanate groups. The structural formula for diisocyanate is:

$$O=C=N-(R)_x-N=C=O$$

where R may be an alkylene group or an arylene group or a combination thereof. To illustrate a diisocyanate having a combination radical, mention may be made of diphenyl methane diisocyanate having the following formula:

$$OCNC_6H_4CH_2C_6H_4NCO$$

In the above example there may be substituted for the meta-toluene diisocyanate the following: a mixed isomer as, for example, 70% meta-toluene diisocyanate and 30% orthotoluene diisocyanate. Another diisocyanate which may be utilized is 1,5, napthyl diisocyanate. An example of an alkyl diisocyanate is hexamethylene diisocyanate.

While in Example I the alkyd polyester is present in an amount of 18 parts by weight per 205 parts of the plastisol containing polyvinyl chloride and tricresyl phosphate and the stabilizer, in general the alkyd polyester may vary from as low as about 2½ parts per 100 parts of plastisol to as high as 50 parts per 100 parts of plastisol and said components may be present in the ratio indicated. While 28 parts of diisocyanate has been used for 205 parts of the plastisol prepared as set forth, in general the aromatic polyisocyanate or the alkyl polyisocyanate or the alkyl aromatic polyisocyanate may vary from as low as 7.5 parts by weight per 100 parts of the plastisol to as high as 50 or 60 parts to 100 parts of the plastisol or said components may be present in the ratio set forth as it is not desired to be limited, for example, to 50 to 60 parts per 100 parts of plastisol. It is desired to point out that the amount of polyisocyanate compounded with the plastisol and the polyester resin shall be sufficient to react to provide enough carbon dioxide for expansion of said plastic mass to the desired degree and at the same time provide sufficient cross-linking reaction.

In all of the examples herein set forth, the polyvinyl chloride plastisol may be prepared utilizing mixtures of polyvinyl chloride and other polymers or copolymers as, for example, polyvinyl chloride-polyvinylidene chloride copolymers, vinyl chloride-vinyl acetate copolymers, and other compatible copolymers wherein the polyvinyl chloride resin comprises at least 70% of the total vinyl resin. In other words, in preparing the polyvinyl chloride plastisol set forth in the above example and the other examples of the present application, the polyvinyl chloride plastisol should contain at least about 70% of the polyvinyl chloride resin and the remainder of the plastisol resin may be other compatible resin polymers of the character set forth or their equivalents. For example, the resin of the polyvinyl chloride plastisol may comprise 70% of polyvinyl chloride and 30% of copolymer vinyl chloride-vinyl acetate, and this composite plastisol resin is utilized in preparing the desired plastisol, the resin being dispersed in the plasticizer. The polyvinyl chloride plastisol resin may contain 75% or 80% or even 100% of straight polyvinyl chloride.

The plastisol as prepared also contains a small amount of stabilizer, as well known in the prior art, stabilizing the final composition against heat and light deterioration. Further, the plastisol may also contain, as well known in the prior art, coloring materials, fillers, surface active agents to alter viscosity, lubricants, and the like.

In carrying out the invention, the amount of water present in the reaction mixture as is well known in the polyisocyanate foamed art, has a substantial bearing on the density of the finished cellular plastic mass, it being well known that the larger the amount of water, the less dense the cellular product so produced. In the present invention, the amount of water may vary substantially and in some cases only the residual water in the polyester may be utilized in the reaction. When additional expansion due to the reaction of water and isocyanate radical is desired, water may be added. In general, the water content of the reactive polyester resin may vary from 0.1% by weight to 2% by weight and the additional water may be utilized to bring the water content of the mixture up to as high as 10% by weight of reactive polyester resin.

In Example I and in the other examples herein set forth, instead of using a polyvinyl chloride resin marketed under the proprietary name of Geon 121, other polyvinyl chloride resins may be used, such as those marketed under the name of Marvinol 3001 (Naugatuck Division, U.S. Rubber Company); Vinylite QYNV (Bakelite Corporation); Opalon 410 (Monsanto Chemical Company); Exon 654 (Plastics Division, Firestone Tire & Rubber Company); and the like.

*Example II*

A mixture of polyvinyl chloride, a plasticizer, and a stabilizer is made by combining the following ingredients:

100 parts Geon 121
50 parts dioctyl phthalate
45 parts diethylene glycol dibenzoate (plasticizer)
5 parts stabilizer The above ingredients are compounded to form a uniform dispersion or plastisol. To the plastisol there is added the alkyd polyester resin prepared as set forth in Example I, said alkyd polyester being marketed by the Pittsburgh Plate Glass Company, as stated, under the trademark Selectron 5922. Thereafter, 0.8 part by weight of water was added to the plastisol containing the alkyd polyester resin, said resin being isocyanate reactive. To the so-prepared mixture, there is added 15 parts toluene diisocyanate, and the resulting mixture was heated for 10 to 15 minutes at 160° F., followed by a second period of heating of between 10 and 15 minutes at 260° F., followed by a final heating period of one hour at 325° F. The resulting cured cellular foamed product is tough, resilient and has a density averaging around 23 pounds per cubic foot.

Example III

A mixture of polyvinyl chloride, a plasticizer and a stabilizer, is made by combining the following ingredients:

120 parts polyvinyl chloride resin
80 parts tricresyl phosphate
5 parts of prior art light and heat stabilizer These ingredients were mixed to form a uniform dispersion of plastisol. There was then added thereto 53 parts by weight of an alkyd polyester resin compound having an acid number of about 40 and a hydroxyl number of about 300, said alkyd resin being isocyanate reactive. The mixture was well stirred and then there was added 47 parts of a toluene diisocyanate compound. The mixture was again stirred to form a uniform dispersion, after which the mixture was placed in a suitable mold and cured at about 260° F. for 40 minutes, followed by an additional period of cure of 40 minutes at 350° F. to form a stiff resilient foam having a density of about 17 pounds per cubic foot.

Example IV

A mixture of polyvinyl chloride, a plasticizer, and a stabilizer is made by combining the following ingredients:

600 parts of polyvinyl chloride (Geon 121)
200 parts of tricresyl phosphate
350 parts of dioctyl phthalate
30 parts of stabilizer These components were compounded to form a uniform dispersion or plastisol. There was then added thereto 40 parts by weight of an alkyd polyester resin compound having an acid number of about 40 and a hydroxyl number of about 300, said alkyd resin being isocyanate reactive. The mixture was well stirred, and then there was added 8.5 parts of water, following which the mixture was again well stirred to disperse the water. To the so-prepared mixture there was added 190 parts of toluene diisocyanate. The mixture was again stirred to form a uniform dispersion, after which the mixture was placed in a suitable mold and cured by heating for about 40 minutes at 260° F., followed by heating for about 40 minutes at 350° F. The resulting foamed cellular product was tough and resilient and had a density of about 13 pounds per cubic foot.

In the examples herein set forth, the amount of aromatic or alkyl polyisocyanate present in the mixture containing the same and the polyvinyl chloride plastisol or its equivalent, and the polyester resin may, in general, vary between the limits of 1 part of polyisocyanate to 4 parts of polyester resin, and as high as 5 parts of polyisocyanate and 1 part of polyester resin, or stated differently, the polyisocyanate may vary from about 25% by weight to 500% by weight of the weight of the polyester resin.

In accordance with the present invention, there has been provided a method of making a cellular plastic composition comprising a polyvinyl chloride plastisol containing polyvinyl chloride and plasticizer therefor, said plasticizer being present in the proportion of between about 40 and about 150 parts by weight for each 100 parts by weight of the dry polyvinyl resin. There is mixed therewith any of the herein described isocyanate reactive polyesters and also a reactive polyisocyanate. The isocyanate reactive polyester resin has an acid number between about 15 and about 60, and a hydroxyl number between about 30 and about 500, and a residual moisture content preferably between about 0.1% and about 2% taken on the weight of the polyester. The isocyanate reactive polyester resin is present in the mixture in the proportion of about 2½ to 50 parts by weight per 100 parts by weight of the polyvinyl chloride plastisol, said reactive polyisocyanate being present in the mixture in the proportion between 25% and 500% by weight taken on the weight of the reactive polyester. Thereafter, the resulting mixture is heat-reacted and forms a set of cellular mass.

The heat-reacting step may be carried out in a plurality of steps. First, the mixture may be heat-reacted to effect a substantially complete expansion of the mass prior to the inception of any substantial degree of setting, and thereafter the so-expanded mass may again be heat-reacted to set the expanded cellular mass. Preferably in the first heating step, the mass is heated to a temperature of below about 260° F. and then when expansion is complete, the mass is heat-reacted at a temperature which will effect setting of the mass into a tough, resilient, cured cellular composition. The mass after being expanded may be heat-reacted at a temperature between the temperature of the first heating step and about 350° F.

The present invention resides not only in the method of making the cellular plastic composition, but in a set cellular reaction product of a mixture of polyvinyl chloride plastisol containing polyvinyl chloride and a plasticizer, said plasticizer being present in the proportion of between about 40 and about 150 parts by weight for each 100 parts by weight of the polyvinyl resin. The mixture which is set contains an isocyanate reactive polyester and a reactive polyisocyanate. The isocyanate reactive polyester has an acid number, a hydroxyl number, and residual moisture content as herein previously specified. The isocyanate reactive polyester resin is present in the mixture in the proportion of about 2½ to 50 parts by weight per 100 parts by weight of the polyvinyl chloride plastisol. The reactive polyisocyanate is present in the mixture in the broad proportion of between 25% and 500% by weight taken on the weight of the reactive polyester.

In the specification when parts are discussed, it is to be understood that these are parts by weight unless otherwise specified.

In the plastisol composition, light and heat stabilizer is present. This may be any of the prior art stabilizers which will so function.

The product herein designated as meta-toluene diisocyanate is sometimes known as meta-tolylene diisocyanate. These designations identify the compound having the following formula: $CH_3C_6H_3(NCO)_2$.

What is claimed is:

1. The method of making a cellular plastic composition comprising mixing (a) a polyvinyl chloride plastisol containing polyvinyl chloride and a plasticizer for polyvinyl chloride, said plasticizer being present in the plastisol in the proportion of between about 40 and about 150 parts by weight for each 100 parts by weight of the polyvinyl resin, (b) an isocyanate reactive polyhydric alcohol-polycarboxylic acid polyester resin having an acid number between about 15 and about 60 and an hydroxyl number between about 30 and 500, (c) a reactive diisocyanate selected from the group consisting of alkylene diisocyanate, arylene diisocyanate and alkylene-arylene diisocyanate and (d) water in an amount between the limits of 0.1% and 10% based on the weight of said polyester resin, said polyester resin being present in the composition in the proportion of about 2½ to about 50 parts by weight per 100 parts by weight of said plastisol, said diisocyanate being present in the composition in the proportion of between 25% and 500% by weight taken on the weight of said reactive polyester and between about 7.5 and about 60 parts by weight for each 100 parts by weight of said plastisol, and heat-reacting the resulting mixture at a temperature not exceeding 350° F. to form a set cellular mass.

2. The method set forth in claim 1 in which said heat-reaction is effected in a first stage at a temperature not exceeding 260° F. to effect a substantially complete expansion of the mass prior to the inception of any substantial degree of heating and thereafter heat-reacting said expanded mass in a second stage at a temperature higher than the temperature employed in said first stage to set said expanded mass.

3. The method set forth in claim 1 in which the diisocyanate is a toluene diisocyanate.

4. The method set forth in claim 1 in which said diisocyanate is meta-toluene diisocyanate.

5. The method set forth in claim 1 in which said diisocyanate is a mixture of ortho- and meta-toluene diisocyanate.

6. The method set forth in claim 1 in which said polyester is the reaction product of glycerol, adipic acid, and phthalic anhydride.

7. The method of making a cellular plastic composition comprising mixing (a) a polyvinyl chloride plastisol containing polyvinyl chloride and a plasticizer for polyvinyl chloride, said plasticizer being present in the plastisol in the proportion of between about 40 and about 150 parts by weight for each 100 parts by weight of the polyvinyl resin, (b) an isocyanate reactive polyhydric alcohol-polycarboxylic acid polyester resin having an acid number between about 15 and about 60 and an hydroxyl number between about 30 and 500, (c) a reactive monomeric organic diisocyanate and (d) water in an amount between the limits of 0.1% and 10% based on the weight of said polyester resin, said polyester resin being present in the composition in the proportion of about 2½ to about 50 parts by weight per 100 parts by weight of said plastisol, said diisocyanate being present in the composition in the proportion of between 25% and 500% by weight taken on the weight of said reactive polyester and between about 7.5 and about 60 parts by weight for each 100 parts by weight of said plastisol, and heat-reacting the resulting mixture at a temperature not exceeding 350° F. to form a set cellular mass.

8. The method set forth in claim 7 in which said heat-reaction is effected in a first stage at a temperature not exceeding 260° F. to effect a substantially complete expansion of the mass prior to the inception of any substantial degree of heating and thereafter heat-reacting said expanded mass in a second stage at a temperature higher than the temperature employed in said first stage to set said expanded mass.

9. A set cellular reaction product of a mixture of polyvinyl chloride plastisol containing polyvinyl chloride and a plasticizer for polyvinyl chloride, said plasticizer being present in the proportion of between about 40 and about 150 parts by weight for each 100 parts by weight of the polyvinyl resin, an isocyanate reactive polyhydric alcohol-polycarboxylic acid polyester resin, and a reactive monomeric organic diisocyanate, said isocyanate reactive polyester resin having an acid number between about 15 and about 60, a hydroxyl number between about 30 and about 500 and a residual moisture content between about 0.1% and about 2%, said isocyanate reactive polyester resin being present in the mixture in the proportion of about 2½ to 50 parts by weight per 100 parts by weight of the polyvinyl chloride plastisol, said reactive diisocyanate being present in the mixture in the proportion of between 25% and 500% by weight taken on the weight of said reactive polyester and between about 7.5 and about 60 parts by weight for each 100 parts by weight of said plastisol.

10. The set cellular reaction product defined in claim 9 in which the reactive diisocyanate is toluene diisocyanate.

References Cited in the file of this patent

UNITED STATES PATENTS

| | | |
|---|---|---|
| 2,576,749 | Carpentier | Nov. 27, 1951 |
| 2,591,884 | Simon et al. | Apr. 8, 1952 |
| 2,606,162 | Coffey et al. | Aug. 5, 1952 |

FOREIGN PATENTS

| | | |
|---|---|---|
| 821,934 | Germany | Nov. 22, 1951 |